United States Patent
Di Rosa

[15] 3,664,267
[45] May 23, 1972

[54] OVERHEAD DUAL-TRACK CONVEYORS SYSTEMS

[72] Inventor: Gaetano Di Rosa, Pino Torinese, Turin, Italy

[73] Assignee: SOC. F.A.T.A. S.p.A., Turin, Italy

[22] Filed: Feb. 16, 1970

[21] Appl. No.: 11,800

[52] U.S. Cl. ............................................. 104/96, 104/172 S
[51] Int. Cl. ........................................................ B65g 17/42
[58] Field of Search ............ 104/172 S, 178, 96, 103, 172 BT

[56] References Cited

UNITED STATES PATENTS

| | | | |
|---|---|---|---|
| 3,408,952 | 11/1968 | Karlstrom | 104/172 BT |
| 3,523,504 | 8/1970 | Jones | 104/172 S |
| 3,314,377 | 4/1967 | Dehne | 104/172 S |

FOREIGN PATENTS OR APPLICATIONS

| | | | |
|---|---|---|---|
| 175,877 | 3/1966 | U.S.S.R. | 104/172 S |

*Primary Examiner*—James B. Marbert
*Assistant Examiner*—Robert Saifer
*Attorney*—Young & Thompson

[57] ABSTRACT

A conveyor system has a first and a second upper track diverging from a continuous lower track. Downwardly projecting pushers supported by the upper tracks couple with carriers on the lower track and drive them forward. The carriers have coupling and uncoupling means such that a following carrier striking a preceding carrier is uncoupled from its pusher because a finger on the preceding carrier swings a detent rocker out of the path of the pusher.

For transfer a zone of the first upper track near the point of divergence from the lower track is lowered. A pusher traversing this zone remains coupled to a carrier even though the rocker of that carrier has been swung to its normally inoperative position. The preceding carrier, arrested on the track because its pusher has moved transversely away the rocker with the curvature of the upper track, is pushed forward by the following carrier. The preceding carrier is then coupled by a pusher of the second upper track and driven along the second conveyor.

5 Claims, 2 Drawing Figures

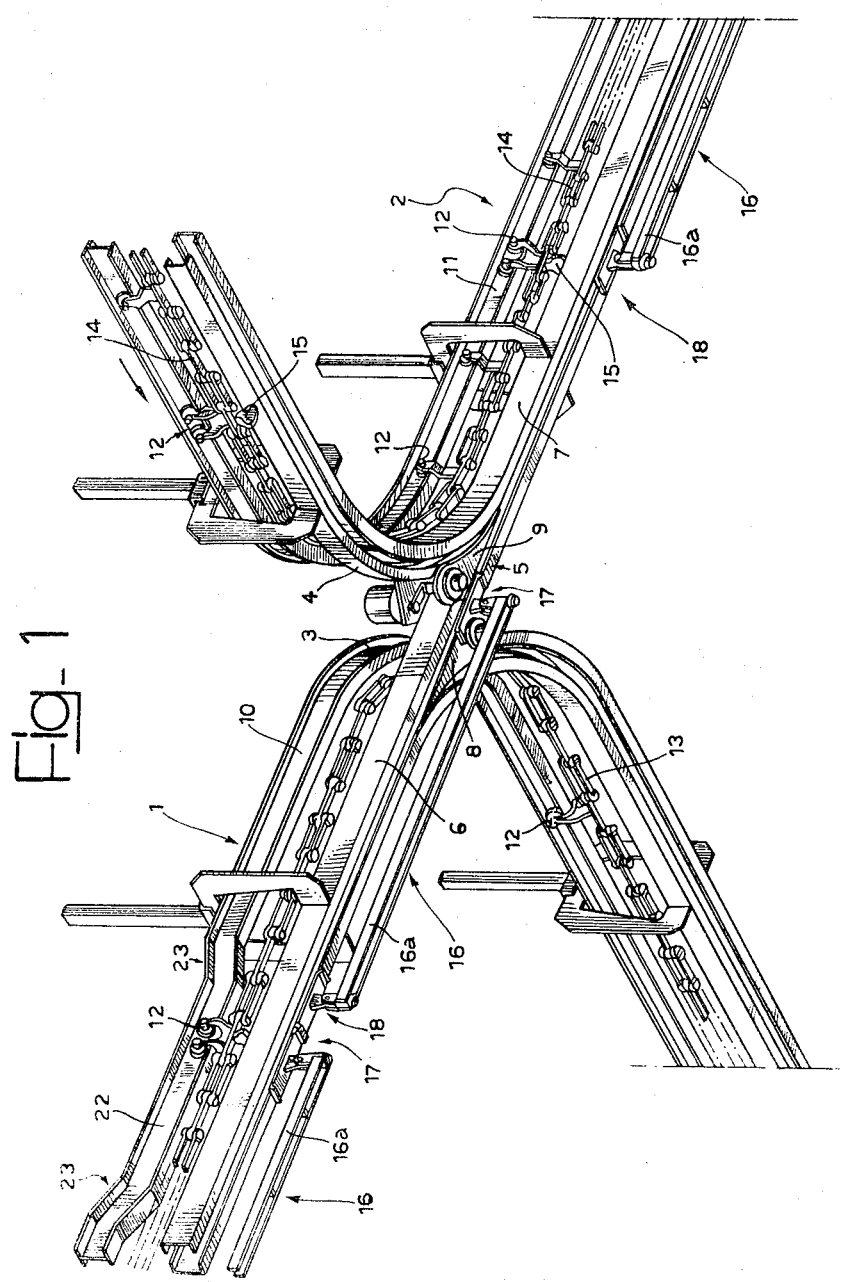

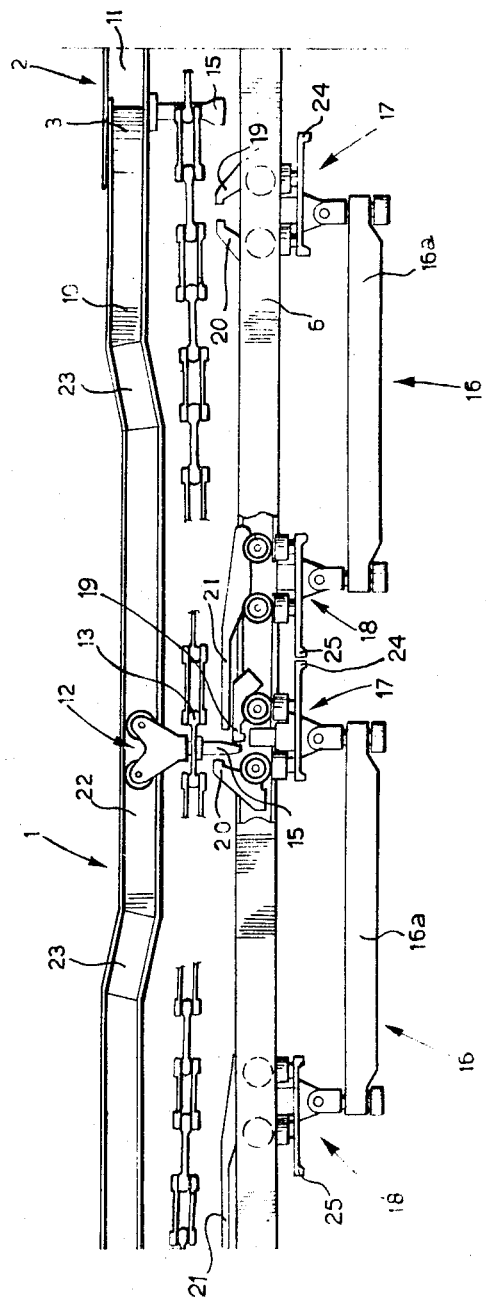

OVERHEAD DUAL-TRACK CONVEYORS SYSTEMS

This invention relates to a conveyor system for carriers, and in particular to dual-track conveyor systems in which the carriers are automatically transferred from a first to a second conveyor. Each conveyor has an upper track associated with driving means such as a chain and pusher members for driving the carriers, and a lower track on which the carriers run, the carriers carrying loads such as workpieces. The lower track is continuous between the first and second conveyors.

In large factories, operations on workpieces are usually carried out in strict sequence, and often the operations take place at different locations. Because the different operations require different speeds of movement of the workpieces along a working or assembly line, it is necessary to use different conveyors.

Moreover, because the speed of movement during working or assembly is far lower than that desirable for the transfer of the workpieces from one department to another, or for moving workpieces to a storage area, it is necessary to have yet other conveyors for this purpose.

As a result, it is necessary to have an interconnected conveyor system of such a nature as to permit the easy transfer of carriers from one conveyor to another.

It is known to transfer a carrier from one conveyor to another by uncoupling it from the first conveyor and allowing it to run by gravity down an inclined zone of the lower track to be engaged by driving means of the second conveyor.

This system, although economical and easy to apply, has numerous disadvantages stemming from the fact that the carrier, in the zone in which it moves by gravity, is not guided. Consequently, powder or other encrustations of whatever kind which may be present on the tracks can slow down or arrest the carriers. Moreover, the speed at which the carriers run on the inclined zone is dependent upon the load carried, the oscillation of the load and the smoothness of running of the individual carriers.

All these irregularities can cause substantial damage to the conveyor system and also, above all, loss of production.

Attempts have been made to overcome these disadvantages by introducing, between one conveyor and another, short auxiliary conveyors for the sole purpose of transferring carriers from one conveyor to another. Because the auxiliary conveyors are provided with their own driving chains, all drawbacks stemming from the irregular running of unguided carriers are eliminated. However, because the auxiliary conveyors require motors and automatic controls, the whole plant becomes more complex and production costs and operating costs rise.

To eliminate auxiliary conveyors from the system, and to permit controlled transfer of a carrier from a first to a second conveyor on which the carriers travel at relatively different speeds, numerous devices have been proposed. In such devices, and in particular in that described in British Pat. No. 1,102,202, the carriers have at their leading end two upwardly facing detent rockers converging towards each other, the forward rocker being adapted to engage a pusher member. The carrier also has at its trailing end an upwardly facing fixed detent which is lower than the rockers and is normally located below the path of the pusher members. Near the points of divergence of the two upper conveyor tracks from the continuous lower track the first upper track has a lowered zone parallel to the lower track. In this lowered zone the distance between the upper track and the lower track is such that pusher members of the first upper track can engage the fixed detent. When a carrier approaches the divergence of the first upper track from the lower track, the pusher member disengages itself from the rockers as the driving chain curves away from the lower track, and the carrier comes to rest on the lower track. Its trailing or rear end is at this stage below the lowered zone of the upper track. An auxiliary pusher member provided on the driving chain then engages the fixed detent and moves the carrier forward on the lower track to a position in which the rockers at its leading end can be engaged by a pusher member of the second upper track. The carrier is thus transferred to the second conveyor and is driven along it.

This system has the disadvantages that the fixed detent complicates the carrier construction, and also requires auxiliary pushers on the driving chain. In systems where the carriers are closely spaced, it is not possible to introduce auxiliary pushers since they require a relatively large spacing between carriers. Moreover, even where the use of auxiliary pushers is feasible, they complicate the control system which is always provided at the start of the first conveyor to regulate the initial introduction of the carriers since the control system must be able to distinguish between a normal pusher member and an auxiliary pusher member.

An object of the invention is to provide a system in which transfer of the carriers from the first upper track to the second upper track takes place by causing a preceding carrier arrested on the lower track, with at least its forward end located between the points of divergence of the first and second upper tracks, to be pushed forward by a following carrier which is driven by a normal pusher of the first upper track. Thus no auxiliary pushers are required on the driving chain, no special transfer detent is required on the carriers, and the control system at the start of the first conveyor is simplified. Since such control systems are generally complex electronic devices, such simplifaction alone can lead to substantial savings.

The invention provides a conveyor system for carriers, comprising a continuous lower track; a first and a second upper track, each having a zone parallel to the lower track and a zone diverging at a point from the lower track, the points of divergence of the two upper tracks from the lower track being spaced apart from each other; a series of pusher members spaced at intervals from each other along each upper track and arranged to be driven along such track, each pusher member projecting downwardly below such upper track; a plurality of carriers mounted on the lower track, each carrier being adapted to support a load; an upwardly facing coupling device carried by each carrier and comprising two detent rockers mounted for oscillating movement in a vertical plane, the detent rockers having rest positions in which they are raised to intersect the path of the pusher members, and are oscillatable from their rest positions towards each other to a non-operative position in which they are below the path of the pusher members, the detent rockers defining between them a space to receive and couple a pusher member for driving of the carrier by the pusher member; an uncoupling device carried by each carrier rearwardly of the coupling device and consisting of a rearwardly projecting finger, such finger being adapted, when the carrier on which the finger is mounted makes contact with a following carrier, to strike the forward detent rocker of the following carrier and oscillate it into its non-operative position and thus cause such following carrier to be uncoupled and arrested on the track; the improvement being that the first upper track has a lowered zone parallel to the lower track, the length of the lowered zone being at least as great as the length of a carrier, the lowered zone being spaced at such a distance from the lower track as to permit a pusher member moving along such lowered zone to remain coupled with a carrier even if the forward detent rocker of such carrier is moved to its non-operative position by the finger of a preceding carrier which has been arrested on the lower track because the divergence of the first upper track has caused such preceding carrier to be uncoupled from its pusher member and thus arrested, such arrested carrier being then moved along the lower track to be drivingly engaged by a pusher member of the second upper track.

An embodiment of the invention is described below with reference to the accompanying drawings, in which:

FIG. 1 is a perspective view from below of a conveyor system near the divergence of a first and a second conveyor upper track from a lower track; and FIG. 2 is a side elevation view of the system seen in FIG. 1.

In the drawings, a first conveyor 1 and a second conveyor 2 are interconnected to each other at diverging zones, indicated by 3 and 4, by means of connecting zone 5 of a lower track 6 which is rendered continuous by means of portions 8 and 9.

The portions 8 and 9 and their controls are of a known type, and allow carriers to follow the diverging zone 3 of the conveyor 1 instead of being transferred to the conveyor 2 should a curved path be necessary.

An upper track 10 of the conveyor 1 and an upper track 11 of the conveyor 2 support, by means of trolleys 12, chains 13 and 14. The trolleys 12 run on the conveyors 1 and 2 and are solidly connected to driving chains 13 and 14. Each trolley 12 has a downward extension 15 which forms a pusher member adapted to drive carriers 16 mounted rollably on the lower track 6.

The carriers 16 and their means for coupling with the pusher members 15 are of a generally known type, disclosed in U.S. Pat. No. 3,472,177. Each carrier includes a rod 16a depending from two trolleys at its ends, a leading trolley 17 and a trailing trolley 18, rollable on the lower track 6.

The leading trolley 17 has an upwardly facing coupling device in the form of detent rockers of which the forward one is indicated by 19 and the rear one is indicated by 20. The rockers 19 and 20, which are vertically oscillatable towards each other on pins which articulate them to the leading trolley 17, are biased by counterweights towards rest positions in which they are raised to intersect the path of the pusher members 15, and are oscillatable from their rest positions towards each other to a position in which they are located below the path of the pusher members 15. They define between them a space to receive and couple a pusher member 15 for driving of the carrier 16 by the pusher member.

The trailing trolley 18 carries a rearwardly projecting finger 21 of paddle shape which is solidly connected to the trolley 18. The finger 21 forms an uncoupling device, being adapted, when the carrier 16 on which it is mounted makes contact with following carrier, to strike the forward detent rocker 19 of the following carrier and oscillate it into its non-operative position and thus cause such following carrier to be uncoupled and arrested on the lower track 6.

The upper track 10 of the conveyor 1 has, nearby the diverging zone 3, a lowered zone 22 merging with the remainder of the track 10 in two inclined zones 23. The lower zone 22 is longer than the length of a carrier 16. At the lowered zone 22, the distance between the pusher member 15 and the lower track is such that a pusher member located in that zone engages the rocker 19 of the carrier below it even if the rocker 19 is lowered by the finger 21 of a preceding carrier arrested on the conveyor.

The transfer of a carrier takes place in the following way:

When the carrier to be transferred from the conveyor 1 to the conveyor 2 approaches the diverging zone 3, the portions 8 and 9 are preset in such a way as to allow the carrier 16 to continue along the track 6 and not follow the divergence 3. Consequently, the carrier 16 which arrives at the portion 8 is arrested in this position because the chain 13 of the conveyor 1 follows the divergence 3 and the pusher member 15 moves transversely out of the coupling device 19, 20.

At this stage the carrier has its leading end on the connecting zone 5 of the lower track 6 and its trailing end on the track 6 below the lowered zone 22 of the first upper track 10.

When a second or following carrier arrives at this location, the forward bumper 24 thereof contacts the rear bumper 25 of the arrested carrier. The finger 21 on the trailing trolley 18 of the arrested carrier lowers the rocker 19 of the moving carrier, and would cause uncoupling of this following carrier if the contact did not take place at the lowered zone 22.

However, as has been said, at the lowered zone 22 the distance between the pusher member 15 and the lower track 6 is such that the pusher member 15 remains in engagement against the rocker 19 of the following carrier even though this rocker 19 has been lowered by the finger 21 of the preceding carrier 16. The second carrier therefore remains coupled to the chain 13 and pushes the preceding carrier forwards until the leading end of the preceding carrier arrives below the second upper track, that of the conveyor 2. The leading trolley 17 of this preceding carrier has at this stage passed the portion 9 and this carrier can then be coupled by a pusher member of the chain 14 and be driven along the conveyor 2.

The second carrier, once arrived at the connecting zone 5, is abandoned by the pusher member 15 on the chain 13 and is in turn arrested; the cycle repeats itself when a third carrier arrives.

From what has been said above, it can be deduced that a carrier, during transfer from the conveyor 1 to the conveyor 2, is never left uncontrolled while in motion but is always guided by the chain 13.

In the system as described above, the connecting zone 5 of the lower track 6, which is of course equal in length to the distance between the points of divergence of the conveyors 1 and 2 from the lower track 6, is relatively short. The distance between the forward end of the lowered zone 22 of the track 10 and the divergence 3 is also relatively short. The combined length of these two short distances should be not greater than the length of a carrier 16. If the combined length is however greater than the length of a carrier 16, but not greater than twice that length, then not one but two carriers will be arrested in the vicinity of the connecting zone 5 during transfer operations. More carriers might be arrested in this vicinity if the combined length were even greater. The "length" referred to is of course the distance spanned by bumpers 24 and 25 and does not include the length of finger 21.

In normal operations of an assembly or working line it would be desirable to have only one carrier arrested during transfer, and it is therefore preferable that the combined length mentioned above should be less than the length of one carrier.

The length of the lowered zone 22 should itself be at least as great as the length of a carrier 16 if the system is to function properly. If the zone 22 were shorter than a carrier 16, the situation might arise that a carrier would be arrested on the lower track with its ends straddling the lowered zone 22, and in this condition following carriers arriving at the arrested carrier would be uncoupled without pushing the arrested carrier forward to the conveyor 2, and all subsequently arriving carriers would be uncoupled and stopped on arrival.

What I claim is:

1. A conveyor system comprising a continuous lower track; a first and a second upper track, each having a zone parallel to the lower track and a zone diverging at a point from the lower track, the points of divergence of the two upper tracks from the lower track being spaced apart to define a transfer gap; a series of pusher members spaced at intervals along each upper track and arranged to be driven along such upper track, each pusher member projecting downwardly below such upper track; a plurality of carriers mounted on the lower track, each carrier having an upwardly facing drive member movable between a rest position in which it is raised to intersect the path of the pusher members and a lower position in which it is located below the path of the pusher members, the drive member being adapted to be engaged by a pusher member for driving of the carrier in a forward direction along the lower track; means on each carrier adapted, when a carrier is stationary on the lower track and is contacted by a following carrier, to cause the drive member of such following carrier to be moved from its raised to its inoperative position; the first upper track having a lowered zone spaced at a lesser distance from the lower track than the rest of the first upper track and disposed immediately in advance of said transfer gap so as to permit a pusher member moving along such lowered zone to remain in driving engagement with the drive member of a carrier even if that drive member is in its inoperative position; the interval between the pusher members on the first upper track being greater than the length of the carrier, whereby each carrier is pushed through the transfer gap by the carrier following it on the lower track.

2. The conveyor system of claim 1, in which the length of the lowered zone of the first upper track is greater than the length of a carrier.

3. The conveyor system of claim 2, in which the lowered zone of the first upper track has a forward end that is spaced rearwardly of the point of divergence of the first upper track from the lower track.

4. The conveyor system of claim 3 in which the distance between the forward end of the lowered zone of the first upper track and the point of divergence of the second upper track from the lower track is less than the length of a carrier.

5. A conveyor system having a continuous supporting track along which a plurality of carriers are adapted to travel; a first power track and a second power track each having a portion aligned with the supporting track and a portion diverging from it at a point, the points of divergence of the power tracks being spaced apart to define a transfer gap; driving means projecting from the power tracks to couple with driving means on the carriers to drive the carriers along the supporting track in zones where the power tracks are aligned with the supporting track; uncoupling means on the carriers which, when a preceding carrier is contacted by a following carrier, cause uncoupling of the driving means of such following carrier from the driving means of a power track by moving the driving means of the carrier into a retracted position relative to the driving means on the power track; the portion of the first power track which is in alignment with the supporting track including a zone of reduced spacing relative to the supporting track, in which zone of reduced spacing the power and supporting tracks are closer to each other than over the rest of their length by a distance such that the driving means on the power track remains coupled to the driving means on the carrier even when such driving means on the carrier is located in its retracted position, thereby causing a carrier arrested on the supporting track at the transfer gap to be pushed by a following carrier across such gap.

* * * * *